Aug. 26, 1969     W. B. NOE     3,463,019
ALIGNMENT MECHANISM FOR STREAM SUPPORTING ELEMENTS
Filed Nov. 3, 1967
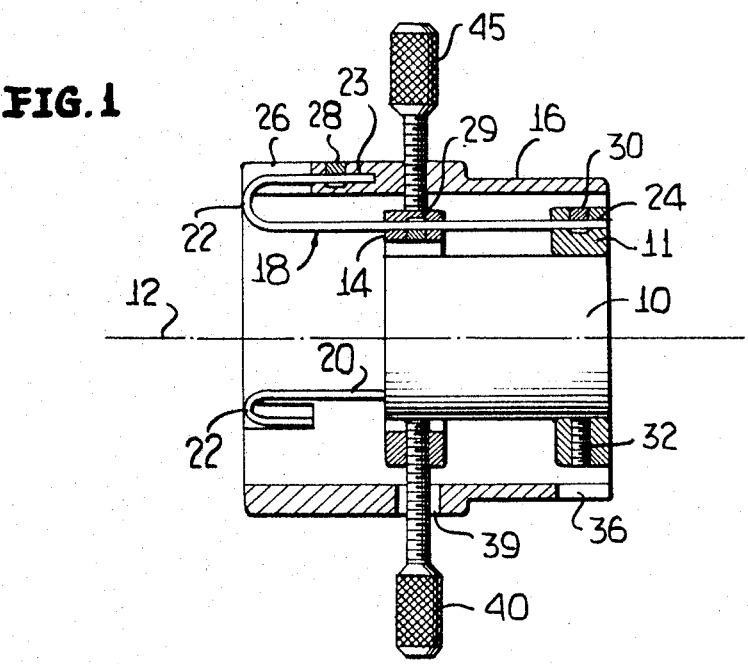
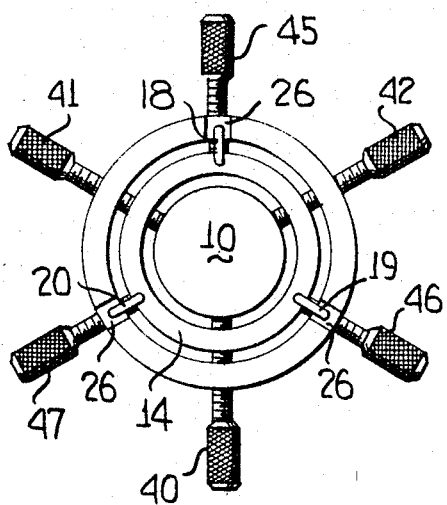
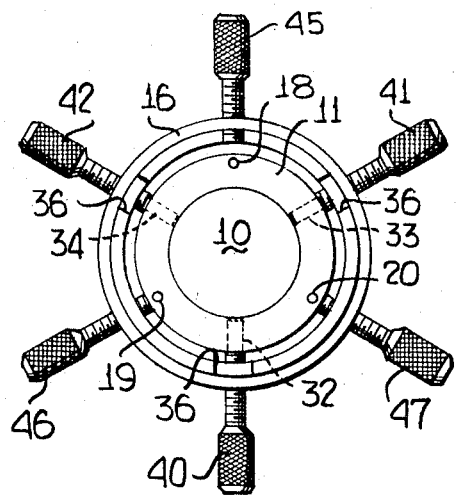
INVENTOR
WILLIAM B. NOE
BY Hurvitz, Rose & Greene
ATTORNEYS 3,463,019
ALIGNMENT MECHANISM FOR STREAM
SUPPORTING ELEMENTS
William B. Noe, Annandale, Va., assignor to Melpar, Inc.,
Falls Church, Va., a corporation of Delaware
Filed Nov. 3, 1967, Ser. No. 680,583
Int. Cl. F16h 27/02
U.S. Cl. 74—89.15        17 Claims

ABSTRACT OF THE DISCLOSURE

A mechanism for adjusting the alignment of elements of a system utilizing a stream, whether fluidic, electronic, or optic, relative to a reference axis, in which three channels are coupled in spaced-apart relationship to share a normally common longitudinal axis by one or more lengths of spring wire each bent back on itself in the form of a loop, such that one of the channels, having dimensions normal to the axis greater than those of the other two, at least partly encompasses the other two, these being spaced apart along the axis. Adjustment or set screws are provided in the walls of each channel to permit mounting and/or aligning one or more elements of the stream-utilizing system relative to the common axis, each screw arranged to produce a reaction, upon adjustment, between only the channel in which it is installed and either the element(s) to be aligned or the spring wire. It is this reaction, without interaction between multiple adjusting devices that produces secure mounting and independent translation and rotation of the element relative to the common or reference axis.

Background of the invention

The present invention relates generally to alignment mechanisms, and more particularly to devices for precisely aligning the elements of a system which requires a stream, whether optic, fluidic, or electronic, with respect to a reference axis.

As used in the present disclosure the term "stream" has its usual and ordinary meanings of "an unbroken flow of gas or particles of matter," which includes pneumatic and hydraulic jets of fluid, and electron and ion beams; and "a ray or beam of light," which, in terms of quanta of energy (i.e., a beam of photons), may be included within the first-mentioned definition. The quoted definitions are taken from Webster's Third New International Dictionary (unabridged), G. & C. Merriam Co., publishers.

In general, prior art methods of alignment of elements of a system of the "stream" type may be categorized as requiring either (a) the selective assembly of the accurately machined parts constituting the system elements, within an appropriate holder or retaining fixture; or (b) multiple, interacting adjustments for one or more degrees of freedom of movement in a coordinate system to provide the desired orientation of one or more system elements within an adjustable retainer. In either case, the alignment procedure is tedious, time-consuming, and expensive, requiring highly-skilled technicians. Alignment that requires multiple adjustments is particularly difficult to obtain where interaction or cross-coupling is involved, that is, where an adjustment of one degree of freedom changes a previous adjustment of the same or a different degree of freedom. Moreover, if the adjustments utilize spring-loading, the final system configuration is vibration-sensitive and is therefore subject to loss of the precise alignment so vital to system operation, in all but the most cushioned or shock-resistant environments.

In the case of an optic(al) system, for example, the mechanical arrangement and mounting of optical parts has required very precise, deliberate procedures by the assembling technician, lest the finest work of the optician be rendered of no avail. The mounting and alignment of lenses or other optical elements along a common optical axis, as is usually necessary, has been achieved in the prior art by placing each optical part in a pre-machined holder such as a shouldered tube, which cooperates with other precisely machined parts in the final assembly to provide the desired optical system. While the machining itself is tedious and costly, it is only the second step in a procedure that first requires the alignment of optical parts in their proper relative positions in a test rig by means of clamps or other temporary devices. Only after the temporary mock-up of the optic system has been completed, and accuracy of alignment verified, can precise relative dimensions and other geometric data be obtained by which to proceed with the machining operation for the final mechanical support structure.

It is clear, then, that prior art techniques and apparatus for alignment of elements of stream-utilizing systems relative to a reference axis or line are laden with disadvantages; and it is a broad object of the present invention to provide mounting and alignment apparatus for the parts or elements of such systems, free of most or all of those disadvantages.

Summary of the invention

Briefly, according to the present invention, the stream-supporting element (or elements) to be aligned with respect to a reference axis is rigidly mounted in one of at least three channels or ducts maintained in spaced-apart relationships by resilient means such that all channels have a normally common longitudinal axis (generally corresponding to the nominal axis of the stream, but not necessarily), and the mounting channel and one of the other channels are disposed in spaced apart relationship along that axis and at least one of them encompassed by the remaining channel. Each channel is provided with adjustment means for producing a reaction between its respective channel and either the element to be aligned or the resilient means, or both, independently of any reaction between each of the other channels and those members; whereby to produce motion, both translation and rotation, of the element relative to the common axis in several degrees of freedom, with little or no interaction of different adjustments.

Accordingly, it is a more specific object of my invention to provide a rigid mount or support for a stream-supporting element wherein the mount is independently movable in translation and rotation relative to a reference axis to permit plural non-interacting adjustments of the orientation of the mount, and the element supported therein, with respect to that axis.

Brief description of the drawings

The above and still further objects, features and attendant advantages of the present invention will become apparent from a consideration of the following detailed description of a preferred embodiment thereof, especially when taken in conjunction with the accompanying drawings, in which:

FIGURE 1 is a sectional view of the preferred embodiment of the alignment mechanism taken in a plane containing the longitudinal axis thereof; and FIGURES 2 and 3 are left-hand and right-hand end views, respectively, of the mechanism of FIGURE 1.

Description of the preferred embodiment

Referring now to the drawings, the mounting and alignment mechanism will be described in relation to a specific use in optical instruments, but, as has been indicated previously, mechanisms and devices in accordance with the present invention are not so limited, and may be used for the same or similar purposes in any stream-utilizing system, including optic, electronic (and ionic), and fluidic.

An optical element generally designated by reference numeral 10 is rigidly mounted within a ring-like channel or duct 11 to normally position its axis coincident with a reference axis 12 constituting the longitudinal axis of symmetry of three distinct channels 11, 14, and 16. The three channels, which may have a polygonal cross-section in contrast to the cylindrical form shown in the drawing, are maintained in spaced-apart relationship by three spring wires 18, 19, 20 equiangularly separated (i.e., 120° apart) about the axis 12.

Each of the spring wires is bent back on itself such that a loop 22 is formed with the two lengths of wire terminating in ends 23, 24 projecting in the same direction and generally paralleling one another and reference axis 12. The outermost end 23 (relative to axis 12), innermost end 24, and centrally disposed portion (relative to loop 22 and end 24) of each spring wire longitudinally intersect and are fastened to channels 16, 11, and 14, respectively. To this end, outer channel 16 is slotted in three places, each designated by reference numeral 26, to allow flexing of the loop 22, and each channel is longitudinally drilled to a tolerance presenting a close fit to the spring wire to be inserted therein. Transverse holes 28, 29, 30 are also provided in each channel to intersect the spring wire holes for brazing or welding the wire to ensure a relatively fixed longitudinal relationship between the three channels.

Mounting channel or receiving collar 11 provides a rigid mount for optical element 10 by appropriate adjustment of three set screws 32, 33, 34. The length of the configuration is preferably such that collar 14 is centrally disposed along that portion of each length of spring wire between loop 22 and end 24, yet is separated from receiving collar 11 by only a distance sufficient to permit encompassing a portion of the periphery of element 10, and in non-contacting relationship therewith. This particular spacing or positioning (in contrast to the non-contact between collar 14 and element 10) is not essential, however, so long as the adjustment reactions to be described presently are permitted within the structure of the mechanism. It will be observed, for example, that channel or cylinder 16 longitudinally encompasses both of channels 11 and 14, but in practice the mounting channel 11 may be disposed outside the end of channel 16, if desired.

To permit access to the set screws in collar 11, cylinder 16 is also slotted at points 36 sufficiently for entry of the tip or blade of a screwdriver. The particular angular orientation of the three set screws is not critical, provided they are equiangularly located about axis 12, but preferably each set screw is positioned diametrically opposite the point at which a wire end 24 is fastened to collar 11, to prevent interference therebetween.

Channel 16 is also provided with three equiangularly-spaced apertures 39 approximately midway of its length, to accommodate translating adjustment means in the form of three screws 40, 41, 42, each of which is threaded within a respective suitable tapped hole in collar 14. Preferably the translating screws are located in the plane containing the reference axis 12 and a respective set screw, i.e., are disposed diametrically opposite a respective spring wire, and are arranged to abut against the element 10 or a portion thereof, in a direction normal to the axis.

Threaded into tapped holes in channel 16 directly opposite the translating screws are three equiangularly-spaced rotating adjustment screws 45, 46, 47, arranged to abut against collar 14 at a point at which a spring wire is fastened, to apply to the respective wire a force tending to pivot end 24 thereof about loop 22.

In use of my alignment and mounting mechanism, angular adjustment of element 10 is obtained first, by appropriate clockwise or counterclockwise adjustment of each of screws 45, 46, and 47. It will be observed that movement of each of these screws places a combined torsion and bending load on the loop end 22 of the respective spring wire in response to the reaction between cylinder 16 and collar 14. In this manner, element 10, which may be an optical element housing, for example, is rotated about an effective pivot point provided by the flexible loop, to a position in which its axis (and that of mounting channel 11) is askew or oblique to reference axis 12. Channels 11 and 14 are, of course, carried by end 24 of the spring wire and follow its pivotal movement as the respective rotational adjusting screw is adjusted. Translating screws 40, 41, 42 offer no restriction to this pivoting or rotating movement because they are not connected to the outer channel 16, i.e., each is free to move in its respective access hole 39. As a practical matter, the translation and rotation of the element 10 will usually be accomplished in small increments, and to this end each of the adjusting screws may be provided with very fine threads.

After rotation of element 10 has been completed, centering of the element along a desired axis may be achieved by adjustment of translating screws 40, 41, and 42. Each of these adjustments places a side force (in a radial plane containing axis 12) on the respective spring wire section or length between mounting collar 11 and adjustment collar 14. As is readily observed, by construction of the mechanism the respective ends of each of these wire sections are constrained to remain parallel; hence, pure translation in the plane orthogonal to element 10 is obtained. In essence, the translating and rotating adjustments are independent of one another, i.e., translation of element 10 has little or no effect on the oblique position to which it had previously been rotated, and vice versa.

While I have disclosed a preferred embodiment of my invention, it will be apparent that variation of the specific details of construction which have been illustrated and described may be resorted to without departing from the spirit and scope of my invention. Moreover, various ancillary modifications may be utilized to enhance the operation of the alignment mechanism. For example, it may be inserted in a rotating shell to provide two additional degrees of freedom.

I claim:

1. Structure for mounting and aligning the axis of an element of a stream-supporting system with respect to a reference axis to provide a desired stream orientation relative to said reference axis, comprising:

at least three open-ended channels, each having a longitudinal axis of symmetry, spring wire means connecting said channels together in spaced-apart relationship with the axis of each channel normally coincident with said reference axis, opposite walls of a first of said channels separated by a distance greater than the separation between opposite walls of each of the other two channels, said other two channels longitudinally separated along said reference axis and at least one thereof longitudinally encompassed by said first channel, in accordance with the coupling provided by said spring wire means, the remaining channel having means for providing a rigid mount for said element therein, said first channel and said at least one channel having adjustment means cooperating with said spring wire means to selectively and independently rotate and laterally translate said remaining channel, and the element rigidly mounted therein, for independently controlling the angular and lateral displacement, respectively, of the axis of said element relative to said reference axis.

2. The invention according to claim 1 wherein said spring wire means comprises a plurality of spring wires generally paralleling said reference axis and longitudinally fastened to a wall of each of said channels.

3. The invention according to claim 2 wherein each said spring wire is bent back on itself to form a loop in which its two ends lie at the terminus of lengths of said wire normally parallel to one another and project in the same general direction, said loop lying in a plane containing said reference axis, the outermost end of said wire relative to said reference axis fastened adjacent one end of and to said first channel, the other end of said wire fastened to said remaining channel, and a portion of the length of said wire approximately intermediate the bend of said loop and said other end of said wire being fastened to said at least one channel.

4. The invention according to claim 3 wherein said rotational adjustment means comprises at least one screw threaded through a wall of said first channel to abut against said at least one channel at a point along a line normal to said reference axis and intersecting said intermediate portion of one of said wires, to apply to said one of said wires a force tending to pivot said remaining channel askew relative to said reference axis.

5. The invention according to claim 4 wherein said translational adjustment means comprises at least one screw threaded through a wall of said at least one channel remote from said point of abutment of the first-named screw, to abut against said element along a line normal to said axis, said at least one channel arranged to at least partly longitudinally encompass said element in non-contacting relationship therewith, the last named screw being adjustable to apply to said element a force tending to translate the axis thereof normal to said reference axis while generally retaining its original longitudinal orientation with respect thereto.

6. The invention according to claim 5 wherein each of said channels is cylindrical, said at least one channel and said remaining channel having the form of rings within said first channel, and wherein are provided a plurality of each of said first-named and last-named screws, disposed in equiangularly spaced planes containing said reference axis relative to members of the same group of screws, whereby to permit adjustment of the orientation of said element in several degrees of freedom.

7. The invention according to claim 1 wherein said spring wire means maintains a fixed longitudinal relationship and an elastic transverse relationship between said channels with respect to said reference axis, and wherein said adjustment means for producing rotation of said remaining channel comprises means for applying to said spring wire means a force in a direction transverse to said axis to produce pivoting of the axis of said other two channels to an oblique position relative to said reference axis, and wherein said adjustment means for producing translation of said remaining channel comprises means for applying to said spring wire means forces normal to said reference axis along a substantial length of said reference axis along which said element is mounted.

8. Apparatus for mounting and positioning an element to orient the longitudinal axis of the element relative to a reference axis, said apparatus comprising
first, second, and third collars each having a longitudinal axis,
the first collar having a width greater than that of either of the second and third collars,
three spring wire loops connecting said collars together in spaced-apart relationship to normally share a common longitudinal axis coincident with said reference axis, with said first collar fastened to the same end of each loop, said second collar fastened to the other end of each loop, and said third collar encompassed by said first collar and fastened to an intermediate portion of each loop approximately midway of the length of each loop, said loops normally disposed equiangularly about said reference axis in respective planes containing said reference axis,
said second collar including means for fixedly retaining said element therein with said element normally sharing said common longitudinal axis and extending longitudinally into said third collar in spaced-apart relationship to the interior surface of said third collar,
first adjusting means coupled to said first collar for exerting a variable force on said loops in a direction transverse to said reference axis for rotating said element about pivot points at the bends of said loops, whereby to angularly displace the longitudinal axis of said element relative to said reference axis, and
second adjusting means coupled to said third collar for exerting a variable force on said element in a direction normal to its longitudinal axis for translating said element in the last-named direction, whereby to laterally displace the longitudinal axis of said element relative to said reference axis.

9. The invention according to claim 8 wherein said element is an optical element.

10. The invention according to claim 8 wherein said element is a housing for optical elements.

11. The invention according to claim 8 wherein said first adjusting means comprises three adjusting screws, each threaded through said first collar in a respective one of said planes to bear against said third collar in the area where said third collar is fastened to said intermediate portion of the respective loop.

12. The invention according to claim 11 wherein said second adjusting means comprises three adjusting screws threaded through said third collar via respective holes in said first collar in respective planes intermediate the first-named planes to bear against said element in the area where said element extends into said third collar.

13. The invention according to claim 12 wherein said second element is also encompassed by said first collar at one end of said first collar, and wherein said bend in each loop is positioned at the other end of said first collar.

14. In combination,
an outer shell having a longitudinal axis,
an adjustment collar surrounding said axis and located internally of and spaced from the interior wall of said outer shell,
first screw means for three dimensionally adjusting the spacing of said adjustment collar with respect to said interior wall in a sense generally orthogonal to said axis,
a receiving collar surrounding said axis and located interiorly of said outer shell and spaced from the interior wall of said outer shell,
resilient rods spaced about the interior of said outer shell and having corresponding ends of said rods secured to said receiving collar, intermediate points of said rods being secured to said adjustment collar and the remaining ends of said rods being secured to said outer shell,
an object secured only in said receiving collar at one position along its length and three dimension positionably with respect to said adjustment collar, and
further screw means for three dimensionally adjusting the position of said object with respect to said adjustment collar.

15. A device for controlling the position of an object, comprising
an outer shell having a longitudinal axis,
an adjustment collar located internally of and spaced from the interior wall of said outer shell,
screw means for three dimensionally adjusting the spacing of said adjustment collar with respect to said interior wall in a sense generally orthogonal to said axis,
a receiving collar located interiorly of said outer shell and spaced from the interior wall of said outer shell,
resilient rods spaced about the interior of said outer shell and having corresponding ends of said rods secured to said receiving collar,
intermediate points of said rods being secured to said adjustment collar and the remaining ends of said rods being secured to said outer shell, means for securing said object immovably with respect to said receiving collar at one position along its length and three dimension positionably with respect to said adjustment collar, and further screw means for three dimensionally adjusting the position of said object with respect to said adjustment collar, said further screw means extending freely through said outer shell and threadedly through said adjustment collar into contact with said object, said first screw means threadedly engaging said outer shell and abutting against said adjustment collar.

16. In combination, an outer shell having a longitudinal axis, an adjustment collar surrounding said axis and located internally of and spaced from the interior wall of said outer shell, first screw means for at least two dimensionally adjusting the spacing of said adjustment collar with respect to said interior wall in a sense generally orthogonal to said axis, a receiving collar surrounding said axis and located interiorly of said outer shell and spaced from the interior wall of said outer shell, resilient rods spaced about the interior of said outer shell and having corresponding ends of said rods secured to said receiving collar, intermediate points of said rods being secured to said adjustment collar and the remaining ends of said rods being secured to said outer shell, an object secured only in said receiving collar at one position along its length and at least two dimension positionably with respect to said adjustment collar, and further screw means for at least two dimensionally adjusting the position of said object with respect to said adjustment collar.

17. In combination, an outer shell having a longitudinal axis, an adjustment collar surrounding said axis and located internally of and spaced from the interior wall of said outer shell, first screw means for three dimensionally adjusting the spacing of said adjustment collar with respect to said interior wall in a sense generally orthogonal to said axis, a receiving collar surrounding said axis and located interiorly of said outer shell and spaced from the interior wall of said outer shell, an object secured only in said receiving collar at one position along its length and three dimension positionably with respect to said adjustment collar, and means constraining said object to maintain its angular relation to said axis during operation of said first screw means.

References Cited

UNITED STATES PATENTS

| | | | |
|---|---|---|---|
| 2,894,430 | 7/1959 | Schuch | 350—247 |
| 2,949,816 | 8/1960 | Weaver | 350—247 |
| 2,477,705 | 8/1949 | Sweet | 350—252 |
| 2,531,509 | 11/1950 | Grundmann | 350—252 |
| 3,028,782 | 4/1962 | Bernhardt et al. | 350—252 |
| 3,036,281 | 5/1962 | Hilliard | 74—89.15 |
| 3,045,535 | 7/1962 | Jacquinot et al. | 74—89.15 |
| 3,204,471 | 9/1965 | Rempel | 74—89.15 |
| 3,334,959 | 8/1967 | Walsh | 74—89.15 |
| 3,359,812 | 12/1967 | Everitt | 74—89.15 |

FOREIGN PATENTS 796,745  6/1958  United Kingdom.

FRED C. MATTERN, Jr., Primary Examiner

W. S. RATLIFF, Jr., Assistant Examiner

U.S. Cl. X.R.

350—247, 252